United States Patent [19]

Schmidt et al.

[11] Patent Number: 4,988,865
[45] Date of Patent: Jan. 29, 1991

[54] DEVICE FOR DETERMINING THE ANGULAR POSITION OF THE DRIVE SHAFT IN A SEWING MACHINE

[75] Inventors: Thomas Schmidt, Rauenberg; Bernd Olbrich, Ketsch; Gerd Nohl, Rauenberg; Gustav Rohr, Nussloch, all of Fed. Rep. of Germany

[73] Assignee: Frankl & Kirchner GmbH & Co KG Fabrik für Elektromotoren u. elektrische Apparate, Schwetzingen/Baden, Fed. Rep. of Germany

[21] Appl. No.: 325,325

[22] Filed: Mar. 17, 1989

[30] Foreign Application Priority Data

Mar. 22, 1988 [DE] Fed. Rep. of Germany ....... 3809569

[51] Int. Cl.⁵ .................................... G01D 5/34
[52] U.S. Cl. .................... 250/231.16; 250/231.18
[58] Field of Search ........ 250/231 SE, 237 G, 231.14, 250/231.16, 231.18, 231.13; 341/13, 3; 33/706, 707; 356/373, 375; 112/275

[56] References Cited

U.S. PATENT DOCUMENTS

| 3,381,288 | 4/1968 | Van Vlodrop | 250/231 SE |
| 3,591,842 | 7/1971 | Seewald | 250/237 G |
| 3,982,106 | 9/1976 | Stutz | 250/237 G |
| 4,602,242 | 7/1986 | Kimura | 250/231 SE |
| 4,616,131 | 10/1986 | Burkhardt | 250/231 SE |
| 4,623,790 | 11/1986 | Stössel | 250/231 SE |
| 4,680,466 | 7/1987 | Kuwahara et al. | 250/231 SE |
| 4,751,888 | 6/1988 | Hanus | 250/231 SE |

FOREIGN PATENT DOCUMENTS 0658706 4/1979 U.S.S.R. ................. 341/13

Primary Examiner—David C. Nelms
Assistant Examiner—Michael Messinger
Attorney, Agent, or Firm—Felfe & Lynch

[57] ABSTRACT

In a position indicating device, especially for an industrial sewing machine, with a slotted wheel (3) and a first track (6) of slots (4) having, e.g., 512 slots (4), to permit a null-point synchronization over a relatively small range of rotational angles, and the establishment of definite angular positions, a second track (8) with slots (7) of various widths is provided. The first track (6) of slots (4) is associated with two light barrier arrangements comprising emitters (11a, 11b), receivers (12a, 12b), and masks (13a, 13b) while the second track (8) is associated with one light barrier arrangement. Evaluating systems are connected to the receivers (12) so that, on the basis of the number of slots (4) of the first track (6), the size of the slots (7) passing in each case and corresponding approximately to a multiple of the slot width may be determined through evaluating systems (14, 28) connected to the output, and in this manner to define the rotary angle position.

14 Claims, 3 Drawing Sheets

DEVICE FOR DETERMINING THE ANGULAR POSITION OF THE DRIVE SHAFT IN A SEWING MACHINE

BACKGROUND OF THE INVENTION

The invention is directed to a position signaling device, especially for industrial sewing machines, having a rotatably mounted slotted wheel which can be coupled with a drive shaft of the machine and which has a plurality of equally wide and equidistantly disposed slots and lands forming a first circular track. The device also has fixed slotted masks disposed in back of the slotted wheel in the axial direction, offset from one another circumferentially by a defined angle, and disposed coaxially with the slotted wheel, comprising slots and lands corresponding to the division of the slotted wheel. Each fixed mask has a light emitter or a light receiver disposed axially parallel thereto behind each slotted mask, and having each a light receiver or light emitter, respectively, disposed axially parallel on the other side of the slotted wheel, an electronic evaluating system for determining the rotatory speed and the angle of rotation according to the number of counted light pulses caused by the slots, and for determining the direction of rotation according to the phase shift of the signals on the basis of the angular offset of the slotted masks.

A position indicating device of this kind is disclosed in U.S. Pat. No. 3,723,748, which is hereby incorporated by reference.

For many applications of position indicating devices, e.g., in machine tools, it is necessary that the absolute angular position of certain angular positions of the drive shaft be detected, since these positions correspond to corresponding positions of the tool. In sewing machines, for example, there are two common stop positions, which are designated as position 1 and position 2 and correspond to the needle-raised position and the needle lowered position, respectively. These positions are defined in reference to a null point of the position indicating device. After the machine is turned on, a null-point synchronization must be performed. Conventional position signaling devices must for this purpose cover at least a range of angles of 180° and 360°, respectively, in order to permit the null point to be known with certainty. For the establishment of the definite angular positions referred to above, e.g., position 1 and position 2, in addition to the slotted wheel for measuring the rotatory speed, additional wheels are conventionally needed coaxially with the slotted wheel and at a distance from the latter, e.g., a second wheel for establishing stop position 1 and a third wheel to establish stop position 2.

SUMMARY OF THE INVENTION

Setting out from this, it is the purpose of the invention to configure a position indicating device such that a null-point synchronization will be possible by covering a very small rotational angle, and the setting and detection of definite angular positions is to be achievable in a very simple manner without separate additional wheels.

The slotted wheel has a second plurality of slots forming a second track, which are offset radially from the first track, the slots of the second track having slot widths differing in the circumferential direction, and a third light emitter and a third light receiver provided for the second track. During the pulse duration (window width) of the third receiver corresponding to a particular slot width, a second electronic evaluation system connected to the first is connected to the output of the third light receiver to count the light pulses or light pulse flanks of the first or second receiver for the identification of the corresponding slot of the second track and thus the angular position of the slotted wheel.

In the use of a position indicating device in accordance with the invention in a sewing machine it is especially significant in practical work that a situation occurs in which the drive is disconnected and the handwheel is turned. This turning of the handwheel in the disconnected state of the control then brings the result that the synchronization and the counting can no longer be correct when the control is turned on again, without performing another null-point synchrorization. In accordance with the invention it is possible to perform such a null-point synchronization especially quickly.

A slotted wheel constructed in accordance with the invention requires a null-point detection or null-point synchronization within, for example, an angular range of no more than 45° in addition to the particular window width, because it is possible through the electronic detection and measurement of this magnitude by the counting of the corresponding pulses falling in the window width thus defined. This means that, to determine the absolute angular position of the slotted wheel only one slot in the second track needs to be identified including the position of its edges, in order on this basis to the able to know the position of the null point or of the corresponding position by using the relative position, stored in the evaluating system, of the null point or other angular position. At the same time the electronic storage of the null point or of specific positions makes it possible to change this null point and the situation of these positions by electronic means, preferably by digital programming. Thus, not only does a position indicating device in accordance with the invention make it possible to perform a null-point synchronization by covering a relatively small angular range, but also by means of only a single slotted wheel, other positions can be defined and changed, so that the conventionally necessary mechanical adjustment procedure by turning three disks relative to one another and then locking them mechanically is eliminated. Consequently, a position indicating device in accordance with the invention is not only simpler in construction, but also more convenient to service, and, on account of its free programmability, it is also universally usable, since through programming virtually any desired number of defined, recallable angular positions can be established.

According to a first embodiment provision is made for the slots of the first and second track to be disposed and dimensioned relative to one another such that in every one of the window widths defined by the slot width of the slots of the second track there is a different number of complete slots of the first track, and the second evaluating system detects the number of pulses corresponding to these slots. In other words, in this embodiment whole pulses are counted. At the same time it must be considered that the pulse width of the counted pulses is smaller than the pulse width basically determined by the slot width of the slots of the first track, which is to be attributed to the stationary slotted mask behind it in each case.

In another embodiment provision is made for the slots of the first and second track to be disposed and dimensioned relative to one another such that in each of the window widths defined by the slot width of the slots of the second track there falls a different number of front edges or bark edges of slots of the first track, and the second evaluating system counts the number of the positive, i.e., ascending, or negative, i.e., descending, pulse flanks corresponding to these front edges and back edges, respectively.

This kind of evaluation of the pulse flanks makes possible an especially sharp signal recognition and unmistakable coordination of positions.

For the achievement of an evaluation independent of the sense of rotation, provision is made such that the positive, i.e., ascending pulse flanks are counted by the second evaluating system when the rotation is in a first direction (forward), and when it is in a second direction (backward) the negative, i.e., descending pulse flanks are counted.

In this connection provision is preferably made for the slots of the first and second tracks to be disposed and dimensioned relative to one another such that the number of evaluated slot edges of the first track, which form the pulse flanks, within each window range defined by the slots of the second track, is greater than the number of the edges forming the unevaluated pulse flanks.

This means that, when, for example, the edges of the slots of the first track which are leading in the direction of rotation are evaluated, these slots are so disposed relative to the slots of the second track that more front edges will be within the window range than rear edges, i.e., a rear edge can be cut off by the window range. The same applies in the case of a rotatory movement in the reverse direction, in which case the same edges of the slots are evaluated, but then they are descending flanks.

Preferably provision is made for the second track and the associated third emitter and receiver to be disposed radially inside of the first track. Then the larger circumferential portion lying radially further out will be available for the narrower slots of the first track.

In a preferred embodiment the first track has $2^N$ slots, especially 512 slots, and the second track $2^K$, especially eight slots, K and N being whole numbers and K being less than N. This number is the result of the fact that the number of the slots on the first track should be an integral power of two for the achievement of a simple digital evaluation. In the case of the wheel diameters coming under consideration for reasons of structural size, a preferred number of slots of 512 results from this requirement. If eight slots are provided on the inner track, in the case of this number of 512 slots on the outer track, it is possible to associate a different width with the slots on the inner track, and nevertheless to achieve a sufficient separation between the widest and second-widest slot of the inner, second track.

The one slot edges of the slots of the second track are desirably associated with one another at an angular spacing of 45°. An equidistant arrangement of this kind facilitates the evaluation because at least one slot edge is defined in its position relative to the others.

To assure that, in a pulse flank evaluation, the flank to be evaluated does not come too close to the edge of a window area, provision is made for the slots of the first and second tracks and the slots of the mask whose associated receiver is used for counting the pulse flanks, are disposed relative to one another such that the pulse flanks to be counted will be approximately in the center of the smallest slot of the second track or of the window range resulting therefrom.

An especially simple null-point determination that is advantageous as regards evaluation is achieved by using as the null point an edge of a slot of the second track.

DETAILED DESCRIPTION OF THE PREFERRED EMBODIMENT

Figure 1:
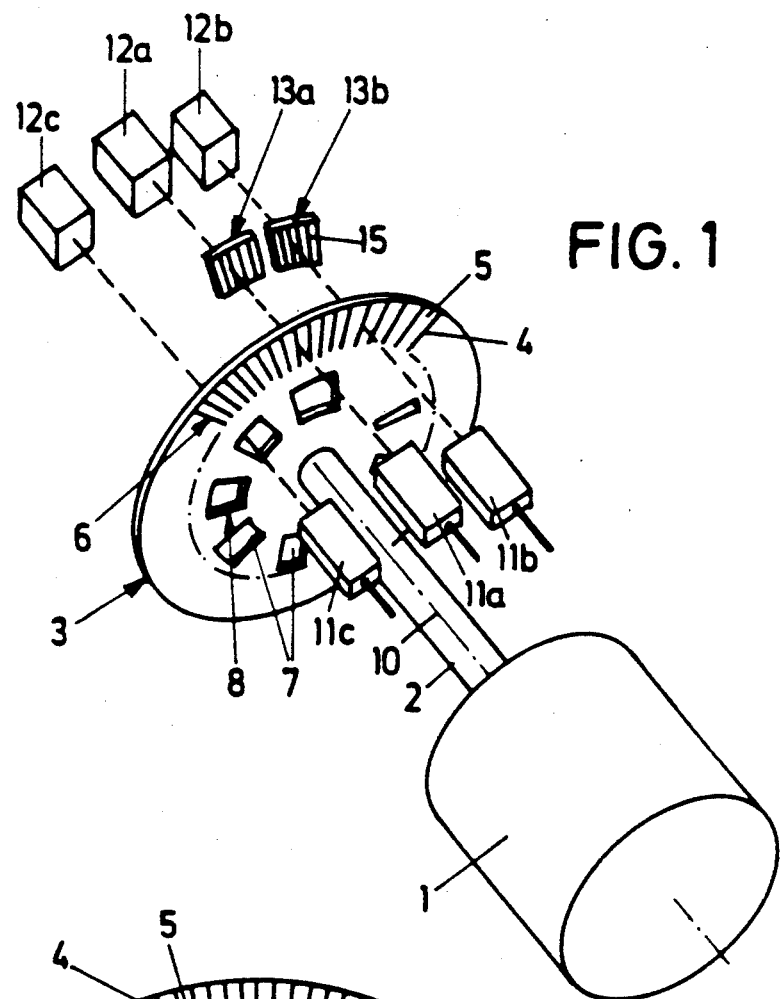
FIG. 1 is a diagrammatic perspective representation of the parts important to the operation of a position signaling device in accordance with the invention.

In FIG. 1 is shown diagrammatically an electric motor 1 with a drive shaft 2 by which a machine, e.g., a sewing machine, not represented in the drawing, is powered.

On the shaft 2 is a slotted wheel 3 which has a plurality of slots 4 in the area of its circumference. Since the number of slots is to be an integral power of 2, preferably 512 slots are provided in the first or outer track 6 formed by this plurality of slots 4.

Radially further in on the slotted wheel 3, a second, inner track 8 is formed of a second plurality of slots 7. There a total of eight slots 7 are provided, each of a different size (slots $7_1$–$7_8$). The width of the narrowest slot $7_1$ corresponds approximately to the width of slot 4.

Figure 2:
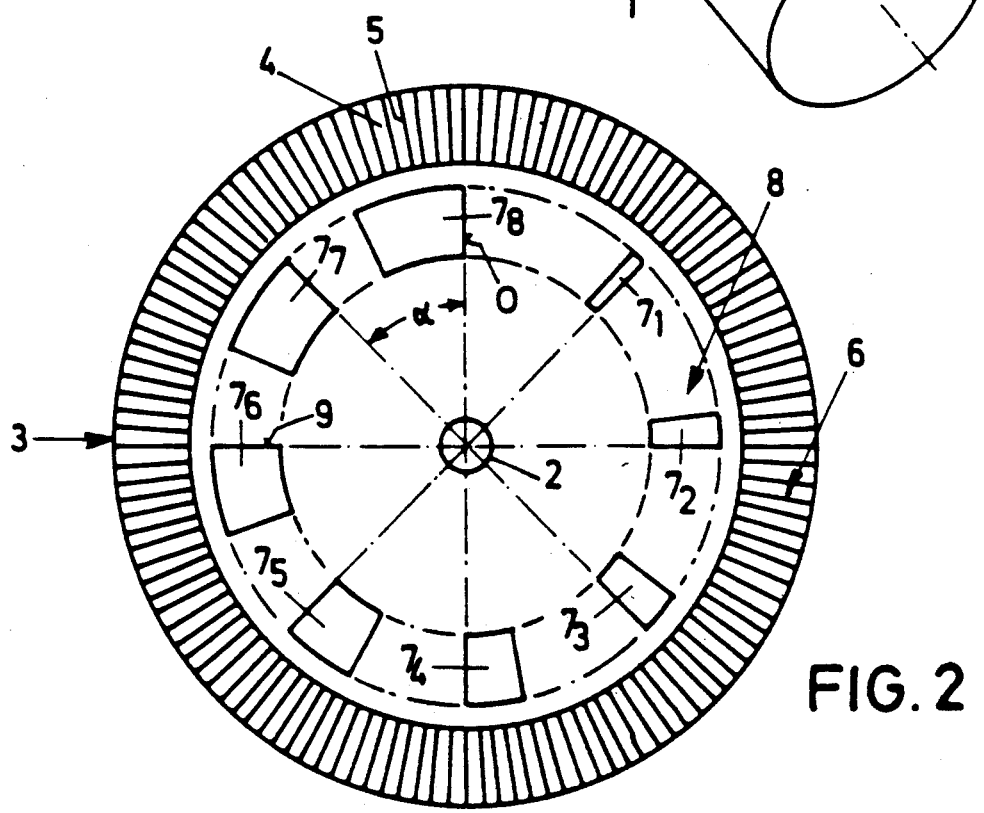
FIG. 2 is a view of a slotted wheel in accordance with the invention.

The edges 9 situated forward in the direction of rotation of the slotted wheel 3 are each offset from 45° in the embodiment by the same angle $\alpha$. The corresponding edge 9 of the largest slot $7_8$ is established as the null point o. The configuration, described above, of the slots 4 and 7 and of the slotted wheel 3 can be seen especially in FIG. 2.

In FIG. 1 it is shown in perspective that three light emitters 11 are disposed axially parallel to the longitudinal axis 10 of shaft 2 in front of the slotted wheel 3, of which the light emitters 11a and 11b are fastened at a radial distance away from the axis 10 which corresponds to the radial distance of the outer track 6 from the axis 4, while light emitter 11c is disposed at a radial distance which corresponds to the radial distance of the second track 8 from the axes.

In the manner of straddling light barriers, a light receiver 12 is associated, on the other side of the slotted wheel 3, with each emitter 11, the light receivers 12a and 12b being accordingly radially further out and light receiver 12c radially further in.

Between the emitters 11a and 11b and the slotted wheel 3 on the one hand and the receivers 12a and 12b on the other, two fixed slotted masks 13a and 13b respectively, are disposed.

By means of the slots 4 and the lands 5 of track 6 of the slotted wheel, the emitters 11a, 11b, which are offset circumferentially from one another by an angular amount, and the correspondingly offset slotted masks 13a, 13b and the receivers 12a, 12b, the rotatory speed of shaft 2 can be determined by the corresponding first electronic evaluating system 14, and the direction of rotation can be determined from the phase shift of the signals in the light beams a and b, as described in U.S. Pat. No. 3,723,748, to which reference is made to avoid repetition. The ratio of the width of the slots 4 and lands 5 is not represented in scale in FIG. 2.

Figure 3:
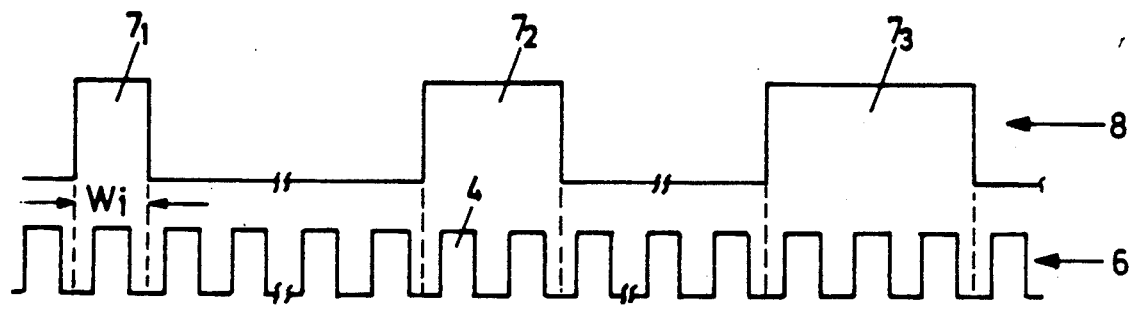
FIGS. 3 and 4 show two variants of the relative position of the slots of the first and second &rack with respect to one another.
Figure 4:
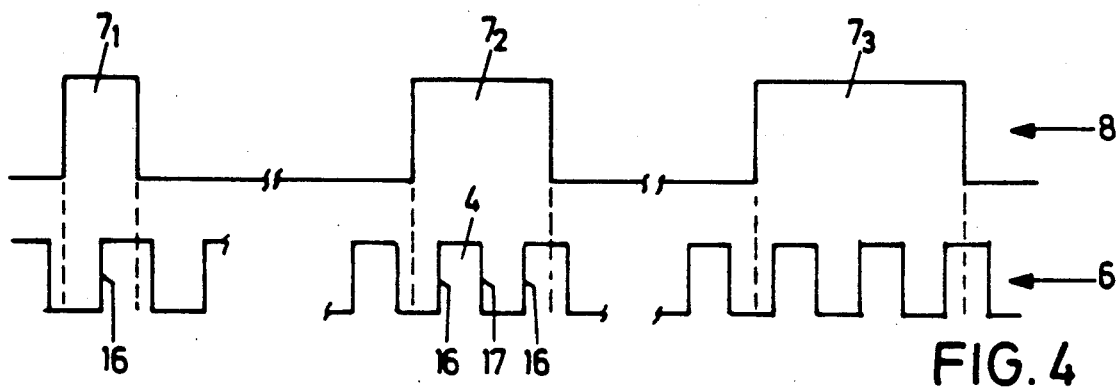
Figure 5:
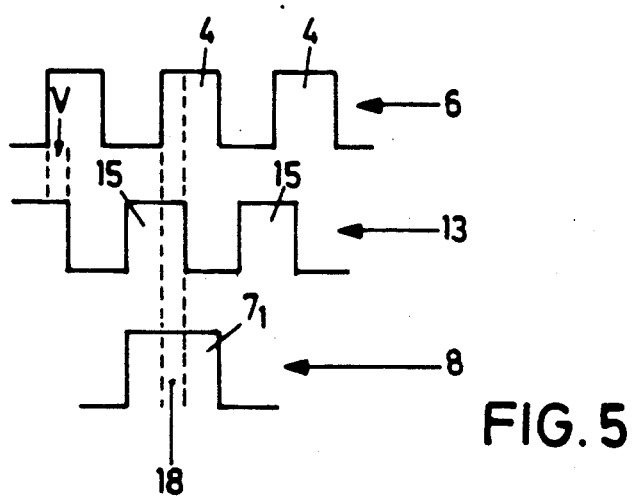
FIG. 5 is a visualization of the relative positioning of the slots on the first and second track relative to one another and relative to the slots of the stationary mask in the embodiment shown in FIG. 4.

Referring to FIGS. 3 to 5, only the preferred dimensioning and arrangement of slots 4 and 7 and of slots 15 of the slotted masks 13 relative to one another will be explained hereinbelow. To achieve a more simple and comprehensible representation, the slots, which are arcuately disposed, are represented linearly one under the other.

FIG. 3 shows an embodiment in which whole pulses corresponding to the slots 4 on outer track 6 are counted electronically. On account of the masks 13, the pulse width does not correspond fully to the width of slots 4. In this embodiment the track 6 and its slots are disposed relative to inner track 8 and its slots 7 such that, in each window width W spanned by a slot 7 there is in each case a whole number of slots 4, i.e., in the example represented in FIG. 3, in the window width W1, which is defined by the slot $7_1$ of track 8, there is one slot 4 of track 6, in slot $7_2$ of track 8 two slots 4, in slot $7_3$ of track 8 three slots 4, etc. If it is generally assumed that the pulse series or the distance between corresponding flanks or slot edges is P, the ratio of window width and number of pulses M in each window will be: $(M - 1)P < W < MP$.

In the embodiment represented in FIG. 4, it is not whole pulses that are evaluated but only pulse flanks 16. In a first direction of rotation, these flanks 16 are ascending flanks, and in a second direction of rotation descending flanks. Accordingly, descending or ascending flanks are evaluated in accordance with the direction of rotation. The geometric arrangement is made such that, in each case, a defined number of evaluated flanks 16 of pulses on the basis of slots 4 in track 6 fall within a window width W which is spanned by the slots 7 in track 8. Accordingly, one flank 16 falls within the window width of slot $7_1$, two flanks 16 within the window width of slot $7_2$, etc. The number of the evaluated flanks 16 in each window area is always one greater than the number of unevaluated flanks 17. In this type of evaluation, the number M' of flanks and the window width W will be as follows:

$$(M-1) P < W \leq \frac{2M-1}{2} \cdot P.$$

FIG. 5 shows how a resultant pulse 18 is formed from the slots 4 of track 6 in cooperation with the slots 15 of the fixed slotted masks 13, the relative position of slots 4 and 7 of tracks 6 and 8 and of slots 15 of the slotted mask 13 being selected such that the pulse 18 or the corresponding pulse flank to be evaluated will be situated in the area of the middle of the smallest window width $W_1$ corresponding to slot $7_1$ of track 8.

Figure 6:
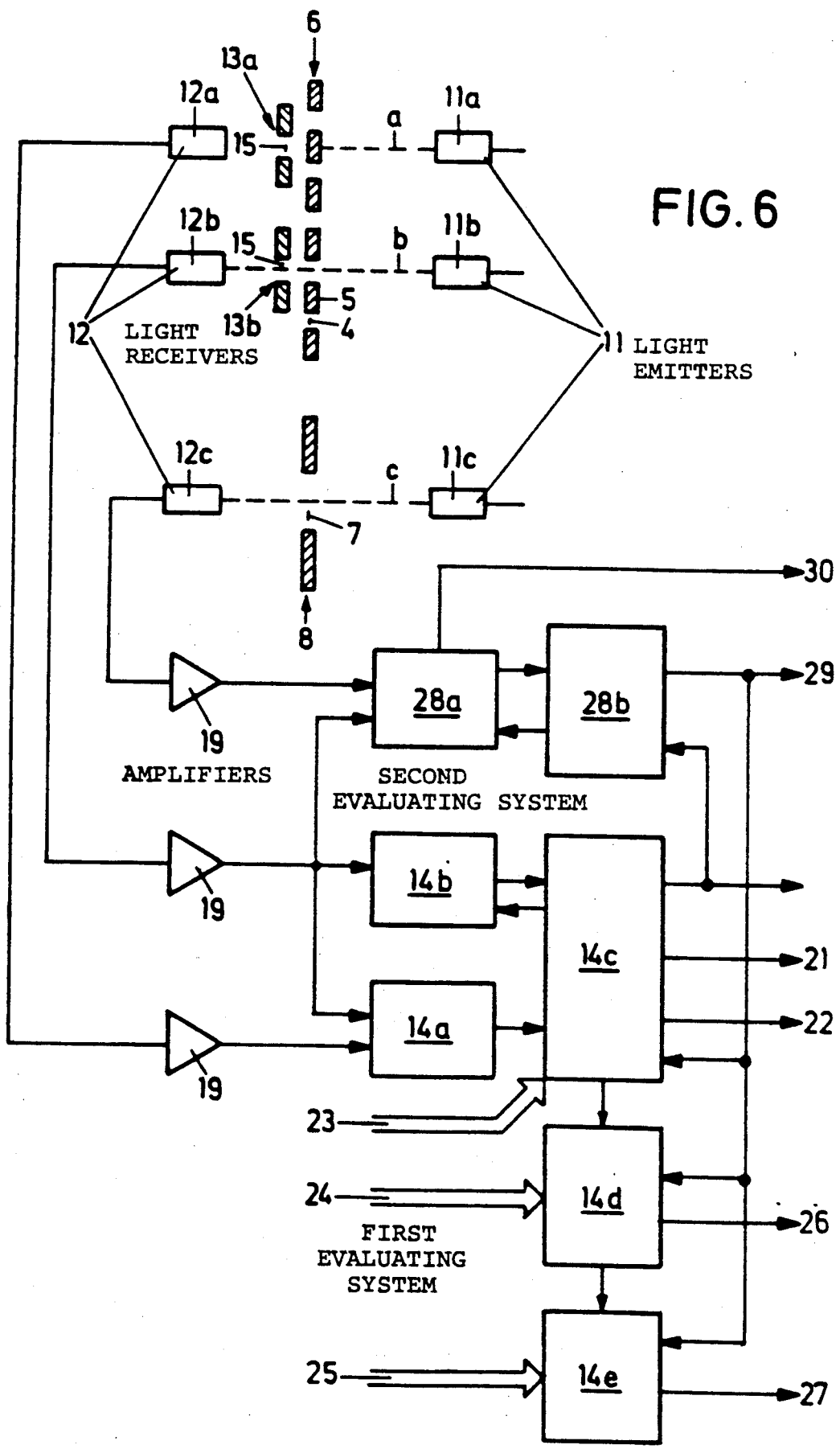
FIG. 6 is a block circuit diagram-like representation of the evaluation systems.

FIG. 6 shows diagrammatically the evaluation of rotatory speed, direction of rotation and null point synchronization, and the formulation of defined angular positions. In the upper part of the drawing tracks 8 and 6 disposed at different radial distance on the slotted wheel are shown one over the other.

The emitters 11 and receivers 12 are represented in block form.

One amplifier 19 is connected to each receiver 12. In the evaluating system 14, through a counter 14b and a phase comparator 14a as well as an evaluation logic 14c containing a microprocessor, an output signal is produced at output 20 for the direction of rotation, at output 21 for frequency of rotation, and at output 22 for the angular position. As symbolically represented by the arrow 23, the angular position 1 can be programmed into the memory system of the evaluating logic 14c. Furthermore, it is possible, as shown by the boxes 14d and 14e and the arrows 24 and 25 to program angular positions relevant to the operation of the particular machine, e.g, the sewing machine, and to output them through the outputs 26 and 27.

For the determination and output of the above-mentioned angular positions, the evaluating system 14 cooperates with an evaluating system 28 which is connected to the output of the receiver 12c of the second track 8, and which includes a counter 28a and an evaluating logic with a microprocessor 28b. Through the evaluating system 28 a null point reference signal is delivered at the output 29 and a position signal corresponding to the particular slot 7i at the output 30.

The absolute angular position of the slotted wheel 3 and thus of the drive shaft 2 can, as it is clear from the above, be determined in accordance with the invention by the fact that, by counting the slots outer on track 6 while a slot 7i is passing on track 8, the width of this particular slot 7is determined. Since all slots 7have a different width, the identification of the particular slot 7is possible in this manner, and the determination of the null point and additional positions is possible according to the known angular position stored in the evaluating system. For the identification of a particular slot 7and thus for the null point synchronization, a range of angular rotation must be traversed, as a rule, which is considerably less than 180°. In the most unfavorable case of a starting position, an angular range of about 45° has to be covered at turn-on in order to permit an unequivocal identification of the angular position.

We claim:
1. Position signaling device, especially for industrial sewing machines, having a rotatably mounted slotted wheel which can be coupled with a drive shaft of the machine and which has a plurality of equally wide and equidistantly disposed slots and lands forming a first circular track, the width of each slot being defined by circumferentially opposed edges, and first and second fixed slotted masks disposed in back of the slotted wheel in the axial direction, offset from one another circumferentially by a defined angle, and aligned with the first track parallel to said axis, each comprising slots and lands corresponding to the division of the slotted wheel, and having a first light emitter and a first light receiver associated with said first mask and a second emitter and a second receiver associated with said second mask, an emitter being located on one side of each mask and a receiver being located on the other side of the wheel from said mask, a first electronic evaluating system for determining the rotatory speed and the angle of rotation according to the number of counted light pulses caused by the slots, and for determining the direction of rotation according to the phase shift of the signals on the basis of the angular offset of the slotted masks, characterized in that the slotted wheel (3) has a second plurality of slots (7) forming a second circular track, which are offset radially from the first track (6), the slots (7) of the second track (8) having slot widths ($W_i$) differing in the circumferential direction, and a third light emitter

(11c) and a third light receiver (12c) being provided for the second track (8), while during the pulse duration (window width) of the third receiver (12c) corresponding to a particular slot width ($W_i$) a second electronic evaluation system (28) connected to the first (14) is connected to the output of the third light receiver (12c) to count the light pulses or light pulse flanks of the first or second receiver (12a or 12b) for the identification of the corresponding slot ($7_i$) of the second track and thus the angular position of the slotted wheel.

2. Position signaling device in accordance with claim 1, characterized in that the slots (4 and 7, respectively) of the first and second track (6 and 8, respectively) are disposed and dimensioned relative to one another such that in each of the pulse durations defined by the slot width ($W_i$) of the slots ($7_i$) of the second track (8) there lies a different number of complete slots (4) of the first track (6) and the second evaluating system (28) detects the number of pulses corresponding to these slots (4).

3. Position signaling device in accordance with claim 1, characterized in that the slots (4 and 7, respectively) of the first and second track (6 and 8, respectively) are disposed and dimensioned relative to one another such that, in each of the pulse durations defined by the slot width ($W_i$) of the slots ($7_i$) of the second track, there lies a different number of evaluated pulse flanks (16) of the first track (6) and the second evaluating system (28) detects the number of these pulse flanks (16), said pulse flanks being formed by circumferentially opposed edges of the slots in the first track.

4. Position signaling device in accordance with claim 3, characterized in that the positive, i.e., ascending pulse flanks, (16) are counted by the second evaluating system (28) upon a rotating movement in a first direction (forward), and upon a rotating movement in a second direction (backward) the negative, i.e., descending pulse flanks (16), are counted.

5. Position signaling device in accordance with claim 3, characterized in that the slots (4 and 7, respectively) of the first and second track (6 and 8, respectively) are disposed and dimensioned relative to one another that the number of the evaluated slot edges of the first track (6) forming pulse flanks (16) within each window area ($W_i$) defined by the slots ($7_i$) of the second track (8) is greater than the number of the edges forming pulse flanks which are not evaluated.

6. Position signaling device in according to claim 1, characterized in that the second track (8) and the associated third emitter (11c) and receiver (12c) are disposed radially within the first track (6).

7. Position signaling device in accordance with claim 1, characterized in the first track (60) includes $2^N$ slots, and the second track (8) $2^K$ slots, K and N being whole numbers and K<N.

8. Position signaling device in accordance with claim 7, characterized in that the one slot edges (9) of the slots (7) of the second track (8) are each at an angular distance apart (a) of 45 degrees.

9. Position signaling device in accordance with claim 3, characterized in that the slots (4 and 7) of the first and second tracks (6 and 8, respectively) and the slots (15) of the mask (13) whose associated receivers (12a and 12b, respectively) are used for counting the pulse flanks (16) are disposed relative to one another such that the pulse flanks (16) are disposed relative to one another such that the pulse flanks (16) to be counted are situated approximately in the center of the smallest slot ($7_1$) of the second track (8) or of the window area ($W_1$) resulting therefrom.

10. Position signaling device in accordance with claim 1, characterized in that a slot edge (9) of a slot (slot $7_8$) of the second track is used as a null point (0).

11. Position signaling device in accordance with claim 7 wherein $2^K$ equals eight.

12. Position signaling device in accordance with claim 7 wherein $2^N$ equals 512.

13. Positioning signaling apparatus for an industrial sewing machine having a drive shaft with an axis and a slotted wheel fixed thereto, said apparatus comprising
a first circular track of equally wide and equidistantly disposed slots and lands on said wheel,
first and second fixed slotted masks disposed in back of the slotted wheel in the axial direction, said masks being offset from one another circumferentially by a defined angle and aligned with the first track parallel to said axis, said masks having slots and lands of the same width and spacing as said slots and lands of said first circular track,
a first light emitter and a first height receiver associated with said first mask and a second light emitter and a second light receiver associated with said second mask, an emitter being located on one side of each mask and a receiver being located on the other side of the easel,
a first electronic evaluating system connected to the outputs of the first and second receivers for determining the rotatory speed and the angle of rotation according to the number of counted light pulses caused by the slots, and for determining the direction of rotation according to the phase shift of the signals on the basis of the angular offset of the slotted masks,
a second circular track of slots on said wheel displaced radially from said first track, the slots of the second track having slot widths differing from each other in the circumferential direction and sized to accommodate different numbers of complete slots of the first track,
a third light emitter and a third light receiver aligned with the second track parallel to said axis, said third light receiver having a pulse duration corresponding to the width of a slot in said second track, and
a second electronic evaluating system connected to the output of the third receiver and to the first evaluating system, said second electronic evaluating system counting the light pulses of one of the first and second receiver which lie within the pulse duration of the third receiver to determine the corresponding slot of the second track and thereby determine the angular position of the wheel.

14. Positioning signaling apparatus for an industrial sewing machine having a drive shaft with an axis and a slotted wheel fixed thereto, said apparatus comprising
a first circular track of equally wide and equidistantly disposed slots and lands on said wheel,
first and second fixed slotted masks disposed in back of the slotted wheel in the axial direction, said masks being offset from one another circumferentially by a defined angle and aligned with the first track parallel to said axis, said masks having slots and lands of the same width and spacing as said slots and lands of said first circular track,
a first light emitter and a first light receiver associated with said first mask and a second light emitter and a second light receiver associated with said second mask, an emitter being located on one side of each mask and a receiver being located on the other side of the wheel, a first electronic evaluating system connected to the outputs of the first and second receives for determining the rotatory speed and the angle of rotation according to the number of counted light pulses caused by the slots, each pulse having an ascending flank and a descending flank formed by opposed edges of a slot in said first track, and for determining the direction of rotation according to the phase shift of the signals on the basis of the angular offset of the slotted masks, a second circular track of slots on said wheel displaced radially from said first track, the slots of the second track having slot widths differing from each other in the circumstantial direction and sized to accommodate different number of pulse flanks of the first track, a third light emitter and a third light receiver aligned with the second track parallel to said axis, said third light receiver having a pulse duration corresponding to the width of a slot in said second track, and a second electronic evaluating system connected to the output of the third receiver and to the first evaluating system, said second electronic evaluating system counting the number of pulse flanks of one of the first and second receiver which lie within the pulse duration of the third receiver to determine the corresponding slot of the second track and thereby determine the angular position of the wheel.

* * * * *